(12) United States Patent
Jiang et al.

(10) Patent No.: US 11,691,275 B2
(45) Date of Patent: Jul. 4, 2023

(54) HANDLING DEVICE AND COMPUTER PROGRAM PRODUCT

(71) Applicant: KABUSHIKI KAISHA TOSHIBA, Tokyo (JP)

(72) Inventors: Ping Jiang, Ota Tokyo (JP); Yoshiyuki Ishihara, Kawasaki Kanagawa (JP); Akihito Ogawa, Fujisawa Kanagawa (JP); Atsushi Sugahara, Kawasaki Kanagawa (JP); Seiji Tokura, Kawasaki Kanagawa (JP); Haruna Eto, Kawasaki Kanagawa (JP); Kazuma Komoda, Kawasaki Kanagawa (JP)

(73) Assignee: Kabushiki Kalsha Toshiba, Tokyo (JP)

( * ) Notice: Subject to any disclaimer, the term of this patent is extended or adjusted under 35 U.S.C. 154(b) by 177 days.

(21) Appl. No.: 17/191,447

(22) Filed: Mar. 3, 2021

(65) Prior Publication Data

US 2022/0080590 A1   Mar. 17, 2022

(30) Foreign Application Priority Data

Sep. 16, 2020   (JP) ................... 2020-155714

(51) Int. Cl.
*B25J 9/16*   (2006.01)
*B25J 13/08*   (2006.01)
*B25J 15/06*   (2006.01)

(52) U.S. Cl.
CPC ............. *B25J 9/1612* (2013.01); *B25J 9/161* (2013.01); *B25J 9/1697* (2013.01); *B25J 13/088* (2013.01); *B25J 15/0616* (2013.01)

(58) Field of Classification Search
CPC ........ B25J 9/1612; B25J 9/161; B25J 9/1697; B25J 13/088; B25J 15/0616; B25J 9/1679; G05B 2219/40053; G05B 2219/40563

(Continued)

(56) References Cited

U.S. PATENT DOCUMENTS 9,026,234 B2 *   5/2015   Suzuki ................... G01B 21/16
                                                      700/1
9,043,025 B2 *   5/2015   Brooks ................. B25J 9/1676
                                                      700/255

(Continued)

FOREIGN PATENT DOCUMENTS

JP              6036662 B2      11/2016
JP          2019-162685 A        9/2019

(Continued)

OTHER PUBLICATIONS

Matsumura et al., "Learning Based Robotic Bin-picking for Potentially Tangled Objects," 2019 IEEE/RSJ IROS, pp. 7984-7991 (2019).

(Continued)

*Primary Examiner* — Jaime Figueroa
(74) *Attorney, Agent, or Firm* — Finnegan, Henderson, Farabow, Garrett & Dunner, LLP (57) ABSTRACT

A handling device according to an embodiment includes a manipulator, a normal grid generation unit, a hand kernel generation unit, a calculation unit, and a control unit. The normal grid generation unit converts a depth image into a point cloud, generates spatial data including an object to be grasped that is divided into a plurality of grids from the point cloud, and calculates a normal vector of the point cloud included in the grid using spherical coordinates. The hand kernel generation unit generates a hand kernel of each suction pad. The calculation unit calculates ease of grasping the object to be grasped by a plurality of suction pads based on a 3D convolution calculation using a grid including the spatial data and the hand kernel. The control unit controls a grasping operation of the manipulator based on the ease of grasping the object to be grasped by the plurality of suction pads.

6 Claims, 11 Drawing Sheets

(58) Field of Classification Search
USPC .............. 700/245–264; 318/568.11–568.25
See application file for complete search history.

(56) References Cited

U.S. PATENT DOCUMENTS

| | | | |
|---|---|---|---|
| 9,102,053 B2* | 8/2015 | Suzuki | B25J 9/1697 |
| 9,156,162 B2* | 10/2015 | Suzuki | B25J 9/16 |
| 9,205,558 B1* | 12/2015 | Zevenbergen | B25J 15/0052 |
| 9,457,477 B1* | 10/2016 | Rublee | B25J 15/0023 |
| 9,498,887 B1* | 11/2016 | Zevenbergen | B25J 15/0616 |
| 10,703,584 B2* | 7/2020 | Diankov | G06T 7/73 |
| 11,365,068 B2* | 6/2022 | Wertenberger | B25J 15/0052 |
| 11,407,589 B2* | 8/2022 | Wagner | G05B 19/41 |
| 2013/0158947 A1* | 6/2013 | Suzuki | G06F 15/00 702/155 |
| 2013/0238124 A1* | 9/2013 | Suzuki | B25J 9/1697 700/250 |
| 2013/0238125 A1* | 9/2013 | Suzuki | B25J 9/1612 700/253 |
| 2013/0238128 A1* | 9/2013 | Suzuki | B25J 9/1669 700/258 |
| 2014/0067121 A1* | 3/2014 | Brooks | B25J 9/1676 700/255 |
| 2014/0195053 A1* | 7/2014 | Subotincic | B25J 15/0616 294/213 |
| 2014/0205403 A1* | 7/2014 | Criswell | B25J 15/0028 414/809 |
| 2015/0032252 A1* | 1/2015 | Galluzzo | B60P 1/5423 700/218 |
| 2015/0352721 A1* | 12/2015 | Wicks | G06V 20/10 700/228 |
| 2019/0029178 A1* | 1/2019 | Russel | A01D 46/30 |
| 2019/0071261 A1* | 3/2019 | Wertenberger | B25J 9/1697 |
| 2019/0255701 A1* | 8/2019 | Blankespoor | B25J 15/0616 |
| 2019/0283241 A1 | 9/2019 | Eto et al. | |
| 2019/0283249 A1 | 9/2019 | Komoda et al. | |
| 2020/0130935 A1* | 4/2020 | Wagner | B65G 1/1373 |
| 2020/0130961 A1* | 4/2020 | Diankov | B65G 61/00 |
| 2021/0032034 A1* | 2/2021 | Kalouche | B25J 9/042 |
| 2021/0060769 A1 | 3/2021 | Eto et al. | |
| 2021/0078170 A1 | 3/2021 | Jiang et al. | |
| 2021/0122039 A1* | 4/2021 | Su | B25J 9/163 |
| 2021/0129334 A1* | 5/2021 | Kanunikov | G06T 7/62 |

FOREIGN PATENT DOCUMENTS

| | | |
|---|---|---|
| JP | 2021-37608 A | 3/2021 |
| JP | 2021-037608 A | 3/2021 |
| JP | 2021-45811 A | 3/2021 |
| JP | 2021-045811 A | 3/2021 |

OTHER PUBLICATIONS

Zeng et al. (2019), "Robotic pick-and-place of novel objects in clutter with multi-affordance grasping and cross-domain image matching," The International Journal of Robotics Research, arXiv:1710.01330v5 14 pages (2019).

M. Tian et al., "A Robotic Grasping Algorithm based on Simplified Image and Deep Convolutional Neural Network," 2018 IEEE 4th Info. Tech, and Mechatronics Eng'g Conf. (ITOEC), pp. 849 855 (2018).

Z. Xu et al., "AdaGrasp: Learning an Adaptive Gripper Aware Grasping Policy," arXiv:2011.14206v1, 8 pages (Nov. 28, 2020).

* cited by examiner

HANDLING DEVICE AND COMPUTER PROGRAM PRODUCT

CROSS-REFERENCE TO RELATED APPLICATIONS

This application is based upon and claims the benefit of priority from Japanese Patent Application No. 2020-155714, filed on Sep. 16, 2020; the entire contents of which are incorporated herein by reference.

FIELD

Embodiments described herein relate generally to a handling device and a computer program product.

BACKGROUND

Conventionally, a robot system that automates an object handling work, such as a picking automation system that handles baggage or the like stacked in a logistics warehouse has been known. Such a robot system automatically calculates a grasping position or posture of an object and a placement position or posture in a bin based on sensor data such as image information, and actually executes grasping or release and placement by a robot having a robotic grasping hand like a suction pad. In recent years, with the development of a machine learning technology, a technology of realizing an appropriate operation of a robot by learning has been used.

However, in the conventional technologies, in a case where the number or a position of suction pads is changed, an appropriate handling operation cannot be determined unless re-learning using teacher data for learning the ease of grasping again is performed.

DETAILED DESCRIPTION

A handling device according to an embodiment includes a manipulator, a normal grid generation unit, a hand kernel generation unit, a calculation unit, and a control unit. The manipulator includes a handling tool including a plurality of suction pads and an arm. The normal grid generation unit converts a depth image including one or more objects to be grasped into a point cloud, generates spatial data including the object to be grasped that is divided into a plurality of grids from the point cloud, and calculates a normal vector of the point cloud included in the grid using spherical coordinates. The hand kernel generation unit generates a hand kernel of each of the suction pads based on a position of each of the suction pads in the handling tool and the Posture of the handling tool. The calculation unit calculates ease of grasping the object to be grasped by the plurality of suction pads based on a 3D convolution calculation using a grid including the spatial data and the hand kernel. The control unit controls a grasping operation of the manipulator based on the ease of grasping the object to be grasped by the plurality of suction pads. Hereinafter, embodiments of a handling device and a computer program product will be described in detail with reference to the accompanying drawings.

Example of Device Configuration

Figure 1:
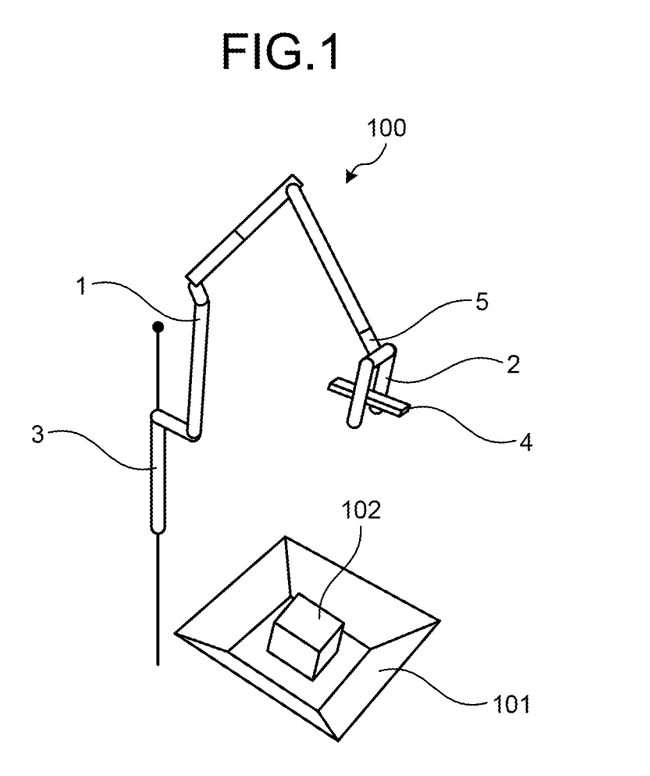
FIG. 1 is a schematic diagram illustrating an example of a configuration of a handling device according to an embodiment.

FIG. 1 is a schematic diagram illustrating an example of a configuration of a handling device 100 according to an embodiment. The handling device 100 according to the embodiment includes an arm 1, a handling tool 2, a controller 3, a camera 4, and a sensor 5. The arm 1 is an articulated robot driven by a plurality of servo motors. The handling tool 2 includes one or more suction pads. The suction pad sucks and grasps an object 102 to be grasped, which is a target to be grasped. The suction pad will be described later with reference to FIGS. 2A and 2B.

The arm 1 and the handling tool 2 operate as a manipulator (robot arm). The camera 4 is attached to the handling tool 2 and captures a depth image of the object 102 to be grasped existing in an article container 101. Note that the number and shapes of objects 102 to be grasped existing in the article container 101 may be arbitrary. The sensor 5 measures information such as a joint angle, a joint force and the like of the arm 1.

Example of Handling Tool

Figure 2A:
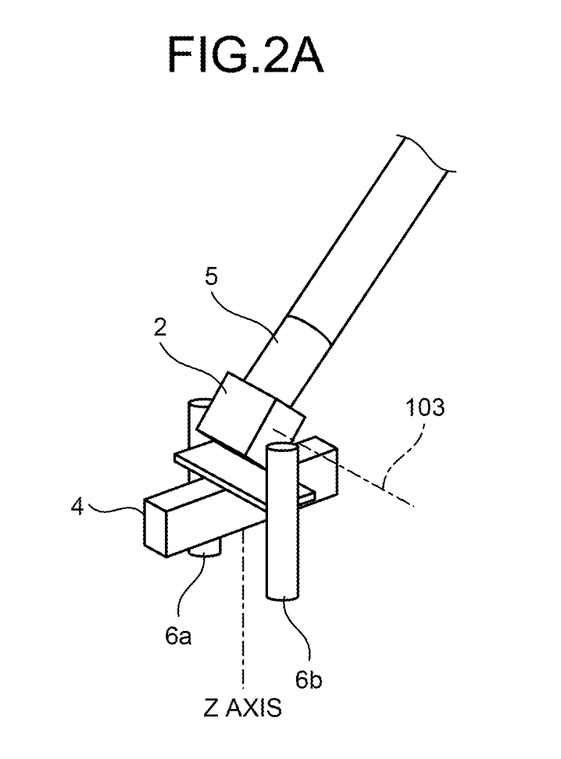
FIG. 2A is a diagram for describing a handling tool according to the embodiment.

FIG. 2A is a diagram for describing the handling tool 2 according to the embodiment. As illustrated in FIG. 2A, the handling tool 2 has a degree of freedom of rotation by a tool rotation axis 103. In addition, the handling tool 2 according to the embodiment includes suction pads 6a and 6b. Note that the number of suction pads included in the handling tool 2 is not limited to two and may be arbitrary.

Figure 2B:
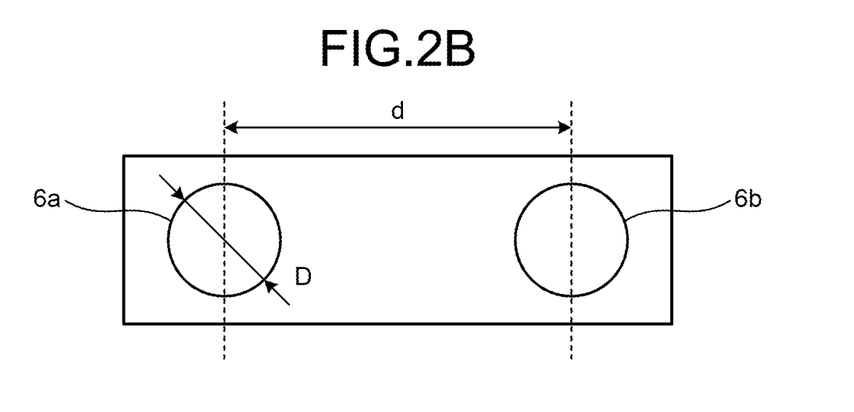
FIG. 2B is a diagram for describing a suction pad according to the embodiment.

FIG. 2B is a diagram for describing the suction pads 6a and 6b according to the embodiment. A diameter of the suction pads 6a and 6b is D. A distance between the center of the suction pad 6a and the center of the suction pad 6b is d. Sizes and shapes of the suction pads 6a and 6b according to the embodiment are the same as each other. Therefore, hereinafter, in a case where the suction pads 6a and 6b are not distinguished from each other, they are simply referred to as a suction pad 6.

Example of Function Configuration of Controller

Figure 3:
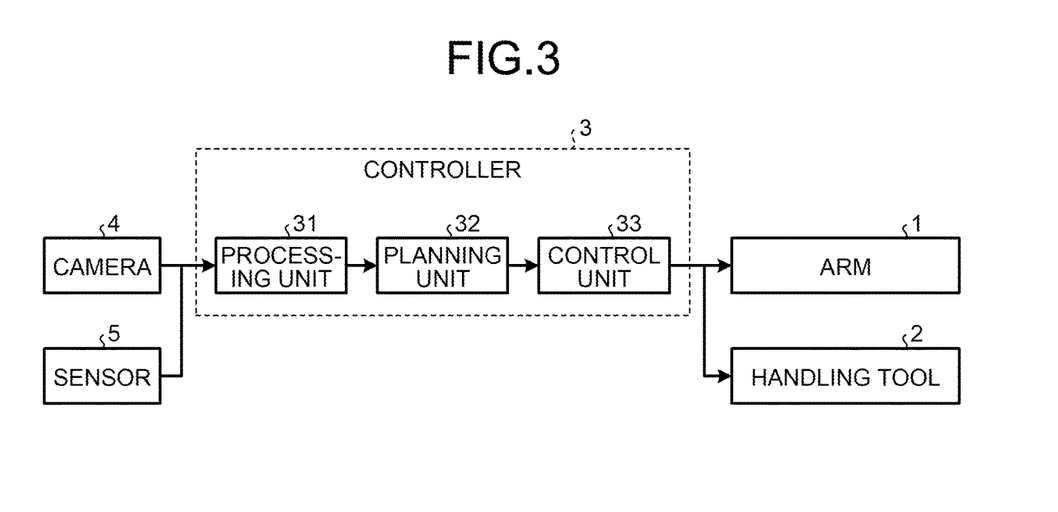
FIG. 3 is a diagram illustrating an example of a functional configuration of a controller according to the embodiment.

FIG. 3 is a diagram illustrating an example of a functional configuration of the controller 3 according to the embodiment. The controller 3 according to the embodiment includes a processing unit 31, a planning unit 32, and a control unit 33.

The processing unit 31 processes data acquired by the camera 4 and the sensor 5. For example, the processing unit 31 performs noise removal processing of the depth image captured by the camera 4. In addition, for example, the processing unit 31 performs background exclusion processing for excluding depth information other than the object 102 to be grasped (for example, the article container 101, the ground and the like) from the depth image. In addition, for example, the processing unit 31 performs image resizing processing for resizing a size of the depth image to a size of the depth image input to the planning unit 32.

The planning unit 32 calculates a heat map indicating the ease of grasping by one suction pad 6 for each pixel coordinate of an image by deep learning. Note that the planning unit 32 calculates a heat map indicating the ease of grasping by the suction pad 6a and a heat map indicating the ease of grasping by the suction pad 6b, respectively, in a case where types of the suction pads 6a and 6b are not the same as each other (sizes, shapes and the like of the suction pads 6a and 6b are not the same as each other).

Next, the planning unit 32 calculates a heat map indicating the ease of grasping by a plurality of suction pads 6 by a 3D convolution based on the heat map indicating the ease of grasping by one suction pad 6. In an example of the embodiment, the planning unit 32 calculates a heat map indicating the ease of grasping using both the suction pads 6a and 6b. Further, the planning unit 32 ranks the ease of grasping, and inputs an optimum grasping posture in which the object 102 to be grasped is most easily grasped to the control unit 33.

The control unit 33 controls behavior of the manipulator (the arm 1 and the handling tool 2) that grasps the object 102 to be grasped according to the optimum grasping posture of the handling tool 2 generated by the planning unit 32.

Example of Function Configuration of Planning Unit

Figure 4:
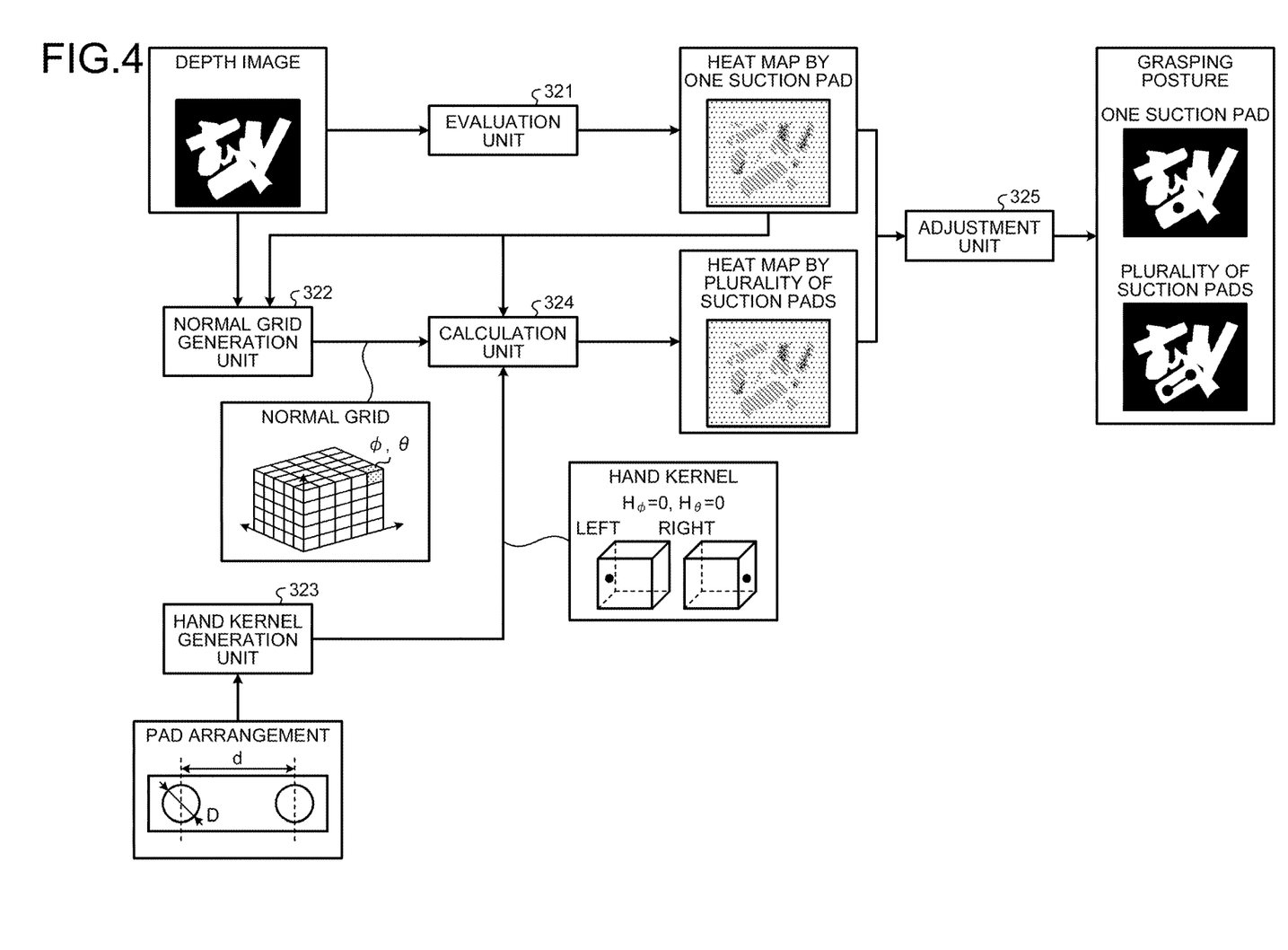
FIG. 4 is a diagram illustrating an example of a functional configuration of a planning unit according to the embodiment.

FIG. 4 is a diagram illustrating an example of a functional configuration of the planning unit according to the embodiment. The planning unit 32 according to the embodiment includes an evaluation unit 321, a normal grid generation unit 322, a hand kernel generation unit 323, a calculation unit 324, and an adjustment unit 325.

The evaluation unit 321 calculates an evaluation value indicating the ease of grasping the object 102 to be grasped by one suction pad 6 based on the depth image. For example, the evaluation unit 321 calculates an evaluation value of each point of the object 102 to be grasped by the heat map based on the depth image.

The normal grid generation unit 322 generates a normal grid based on the depth image, the heat map indicating the ease of grasping by one suction pad 6, and point cloud information converted from the depth image. Details of a method of generating the normal grid will be described later with reference to FIGS. 6 and 7.

The hand kernel generation unit 323 generates a hand kernel of each suction pad 6. Details of the hand kernel will be described later with reference to FIG. 9.

The calculation unit 324 performs a 3D convolution calculation between the normal grid and the hand kernel of each suction pad 6 to find a hand posture that can suck the object 102 to be grasped and a position of the suction pad 6 with respect to the hand posture. Then, the calculation unit 324 calculates a heat map (first heat map) indicating the ease of grasping with the plurality of suction pads 6 from the heat map indicating the ease of grasping with one suction pad 6.

The adjustment unit 325 adjusts a posture of the handling tool 2 and a position where the object 102 to be grasped is grasped by the handling tool 2 based on the first heat map. The adjustment unit 325 ranks the ease of grasping, and calculates a position of a point that is most easily grasped and a grasping posture of the manipulator (the arm 1 and the handling tool 2) represented using the normal.

Example of Processing of Evaluation Unit

Figure 5:
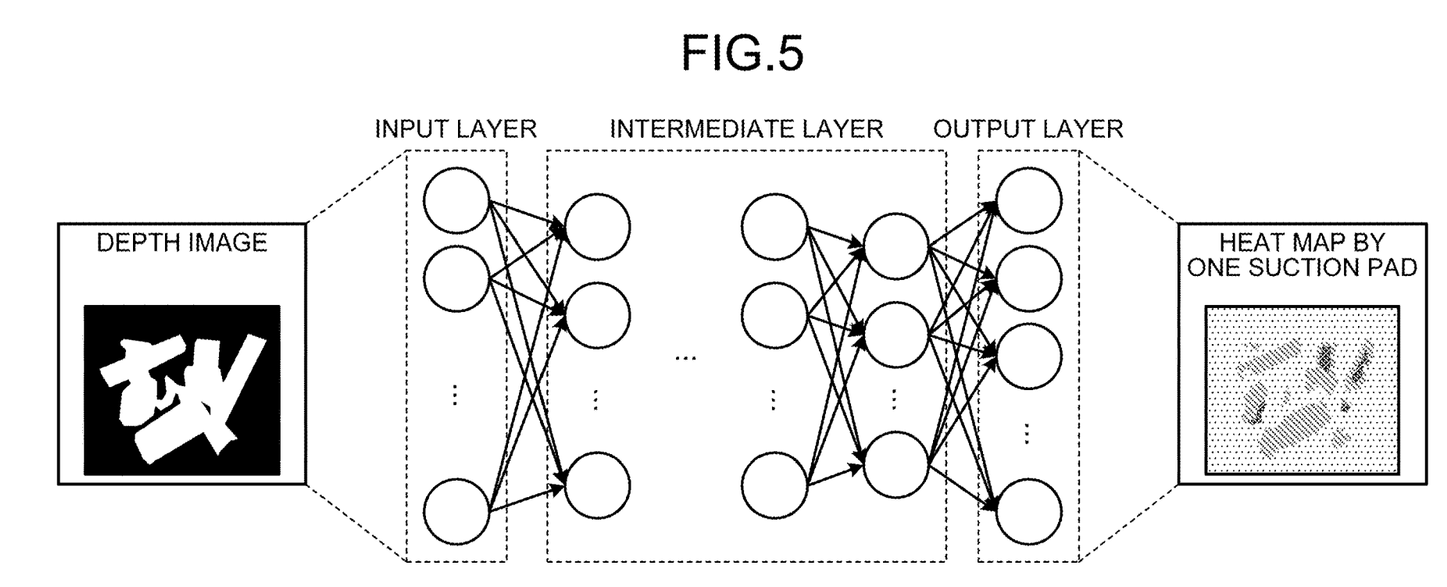
FIG. 5 is a diagram for describing an example of processing of an evaluation unit according to the embodiment.

FIG. 5 is a diagram for describing an example of processing of the evaluation unit 321 according to the embodiment. The evaluation unit 321 calculates the evaluation value indicating the ease of grasping the object 102 to be grasped by one suction pad based on the depth image including one or more objects 102 to be grasped. The evaluation value is a value in which a distance to the center of a region that can be sucked, flatness of the region that can be sucked, and an inclination of the region that can be sucked are considered in a composite manner. Specifically, the evaluation unit 321 calculates the evaluation value using a neural network having an input layer receiving an input of the depth image, an intermediate layer, and an output layer outputting a heat map (second heat map). In the embodiment, each pixel of the heat map indicates a posture at the time of grasping an object at a position of a world coordinate system for a pixel position and an evaluation value (score indicating the ease of grasping).

Example of Functional Configuration of Normal Grid Generation Unit

Figure 6:
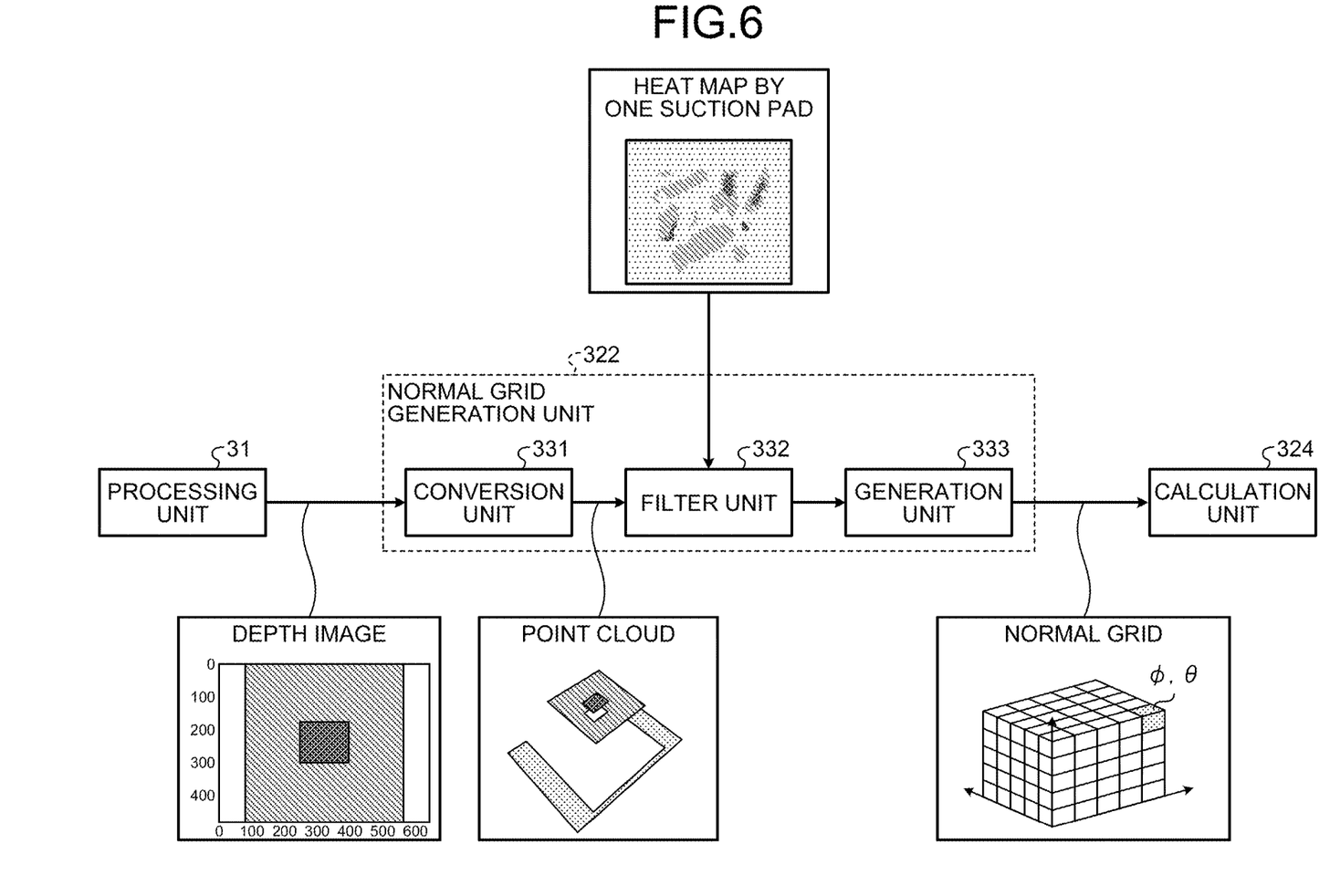
FIG. 6 is a diagram illustrating an example of a functional configuration of a normal grid generation unit according to the embodiment.

FIG. 6 is a diagram illustrating an example of a functional configuration of the normal grid generation unit 322 according to the embodiment. The normal grid generation unit 322 according to the embodiment includes a conversion unit 331, a filter unit 332, and a generation unit 333.

The conversion unit 331 receives the depth image from the processing unit 31. The conversion unit 331 converts a 2.5-dimensional depth image captured by the camera 4 into a point cloud (three-dimensional point cloud data) using a camera matrix.

The filter unit 332 generates grasping target point cloud data by deleting points for pixels whose evaluation values are lower than a threshold value (that is, at which it is difficult to grasp the object) from the point cloud using the heat map output from the evaluation unit 321.

The generation unit 333 generates a normal grid from the grasping target point cloud data input from the filter unit 332. Specifically, the generation unit 333 divides a space in which the camera 4 can capture an image into a cube (grid) of 1×1×1 [m]. The generation unit 333 stores an average value of normal vectors representing directions of normal defined in spherical coordinates of points that are in the grid in each grid to generate the normal grid. Each grid including spatial data including the object 102 to be grasped is used for a 3D convolution calculation for calculating the ease of grasping of the object 102 to be grasped.

Definition Example of Normal

Figure 7:
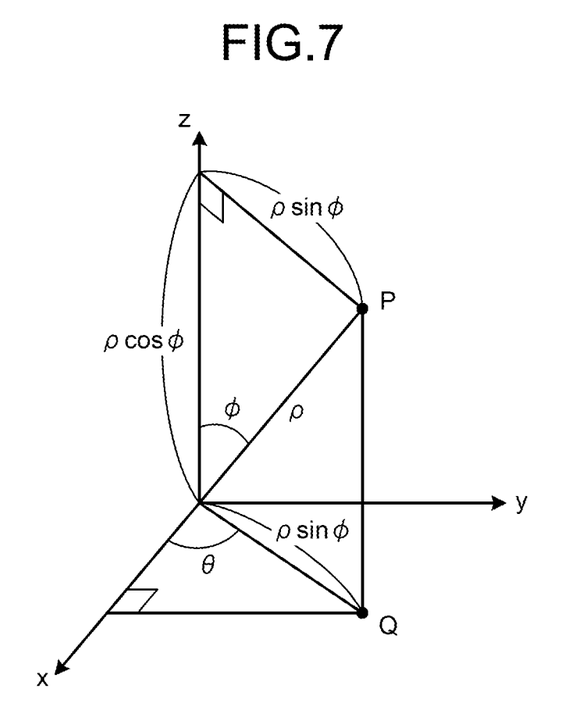
FIG. 7 is a diagram for describing a definition of a normal according to the embodiment.

FIG. 7 is a diagram for describing a definition of the normal according to the embodiment. The normal according to the embodiment is defined in spherical coordinates. Generally, a normal vector n is defined as $[n_x, n_y, n_z]$. A norm $\rho$ of the normal vector n is $(n_x^2+n_y^2+n_z^2)^{1/2}$. Since n is a unit vector, $\rho=1$. The normal vector n is represented by a two-dimensional vector by converting the normal vector n into spherical coordinates (φ, θ) illustrated in FIG. 7. Therefore, a calculation amount of calculation in which the normal vector n is used can be reduced.

If the spherical coordinates (φ, θ) are used, [$n_x, n_y, n_z$] is represented by the following Equation 1.

$$n_z = \rho \cos \phi$$

$$n_x = \rho \sin \phi \cos \theta$$

$$n = \rho \sin \phi \sin \theta \tag{1}$$

Expression Example of Posture of Handling Tool

The posture of the handling tool 2 according to the embodiment is expressed by $H_\phi$ and $H_\theta$ using angles of spherical coordinates, similar to the definition of the normal described above.

Figure 8A:
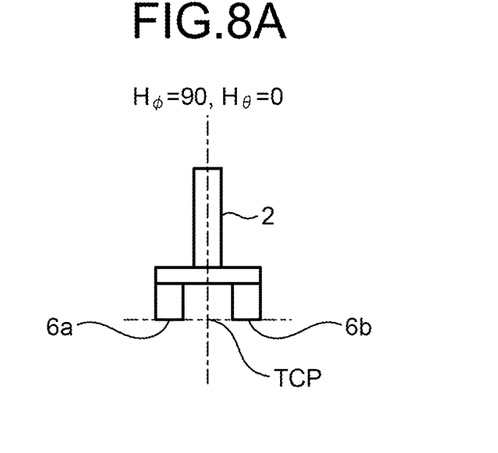
FIG. 8A is a diagram illustrating a first example of a posture of the handling tool according to the embodiment.

FIG. 8A is a diagram illustrating a first example of a posture of the handling tool 2 according to the embodiment. FIG. 8A illustrates a case where $H_\phi$=90 and $H_\theta$=0. TCP indicates a tool center point. FIG. 8A illustrates a case where an inclination does not occur in the handling tool 2.

Figure 8B:
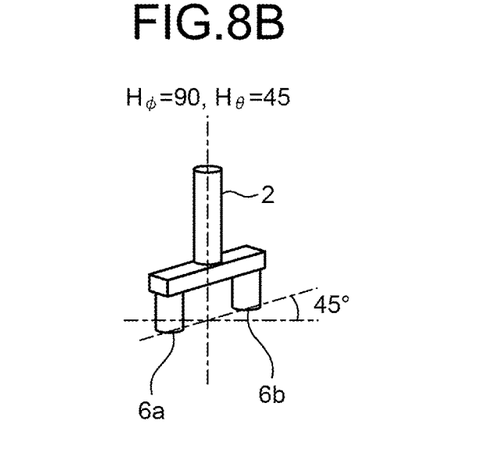
FIG. 8B is a diagram illustrating a second example of a posture of the handling tool according to the embodiment.

FIG. 8E is a diagram illustrating a second example of a posture of the handling tool 2 according to the embodiment. FIG. 8B illustrates a case where $H_\phi$=90 and $H_\theta$=45. FIG. 8B illustrates a case where an inclination of 45° occurs in the handling tool 2 by an angle θ (see FIG. 7) in an xy plane.

Figure 8C:
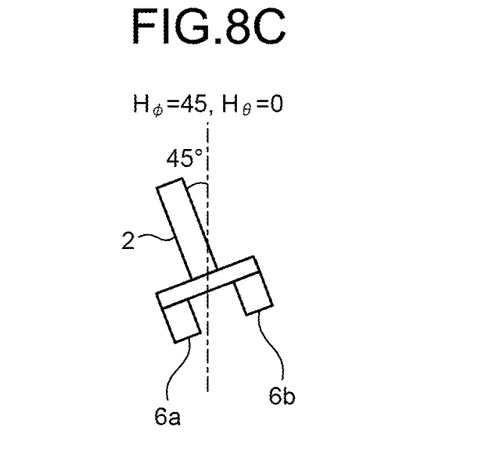
FIG. 8C is a diagram illustrating a third example of a posture of the handling tool according to the embodiment.

FIG. 8C is a diagram, illustrating a third example of a posture of the handling tool 2 according to the embodiment. FIG. 8C illustrates a case where $H_\phi$=45 and $H_\theta$=0. FIG. 8C illustrates a case where an inclination of 45° occurs in the handling tool 2 by an angle φ (see FIG. 7) in a yz plane.

Any posture of the handling tool 2 including the suction pads 6a and 6b can be expressed by any combination of $H_\phi$ and $H_\theta$.

Example of Hand Kernel

Figure 9:
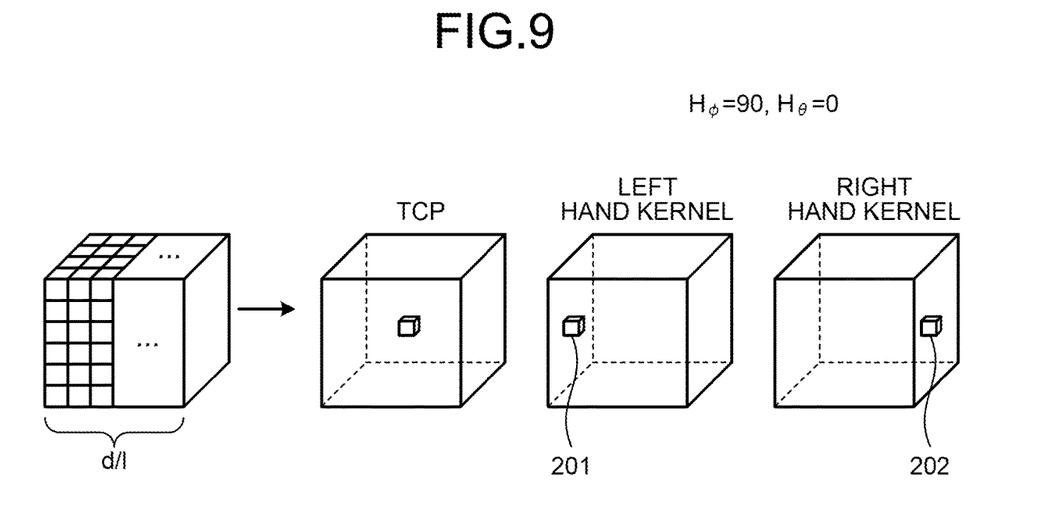
FIG. 9 is a diagram illustrating an example of a position of a tool center point (TCP) and hand kernels according to the embodiment.

FIG. 9 is a diagram illustrating an example of a position of a TCP and hand kernels according to the embodiment. The hand kernel generation unit 323 generates hand kernels of the suction pads 6a and 6b. The hand kernel generation unit 323 expresses the posture of the handling tool 2 by $H_\phi$ and $H_\theta$ using the spherical coordinates to generate hand kernels corresponding to $H_\phi$ and $H_\theta$ for the respective suction pads 6.

Specifically, first, the hand kernel generation unit 323 divides a space representing the posture of the handling tool 2 into a grid of 1×1×1 as in a case of generating the normal grid to create a hand kernel, because the distance between the centers is d. As illustrated in FIG. 9, the center of the hand kernel is a position of the TCP.

Next, the hand kernel generation unit 323 calculates an index (X, Y, Z) in the hand kernel expressing a position and a posture of the suction pad 6 by a relative position and a relative posture with respect to the posture of the handling tool 2, when the posture ($H_\phi$ and $H_\theta$ of the handling tool 2 is determined. For example, in a case where the handling tool 2 includes two suction pads 6a and 6b as in the embodiment, $Index_R(X_R, Y_R, Z_R)$ of a right suction pad 6b is calculated as a right hand kernel by the following Equation 2, and $Index_L(X_L, Y_L, Z_L)$ of a left suction pad 6a is calculated as a left hand kernel by the following Equation 3.

$$Z_R = int(0.5d \cos H_\phi)$$

$$X_R = int(0.5d \sin H_\phi \cos H_\theta)$$

$$Y_R = int(0.5d \sin H_\phi \sin H_\theta) \tag{2}$$

$$Z_L = int(0.5d \cos(\pi - H_\phi))$$

$$X_L = int(0.5d \sin(\pi - H_\phi)\cos(H_\theta + \pi))$$

$$Y_L = int(0.5d \sin(\pi - H_\phi)\sin(H_\theta + \pi)) \tag{3}$$

Here, int( ) indicates a function that approximates a value in ( ) with an integer value.

FIG. 9 illustrates an example of the left and right hand kernels in the case where the posture of the handling tool 2 is $H_\phi$=90 and $H_\theta$=0 (see FIG. 8A). Position 201 of the left hand kernel is represented by the $Index_L(X_L, Y_L, Z_L)$. A value of the left hand kernel is 1.0 at a position of the $Index_L(X_L, Y_L, Z_L)$ and is empty (nan) at the other positions. Similarly, position 202 of the right hand kernel is represented by the $Index_R(X_R, Y_R, Z_R)$. A value of the right hand kernel is 1.0 at a position of the $Index_R(X_R, Y_R, Z_R)$ and is empty (nan) at the other positions.

In addition, a distance between the $Index_L(X_L, Y_L, Z_L)$ and the $Index_R(X_R, Y_R, Z_R)$, that is, $\|Index_L(X_L, Y_L, Z_L) - Index_R(X_R, Y_R, Z_R)\| \approx d$.

Example of Processing of Calculation Unit

Figure 10:
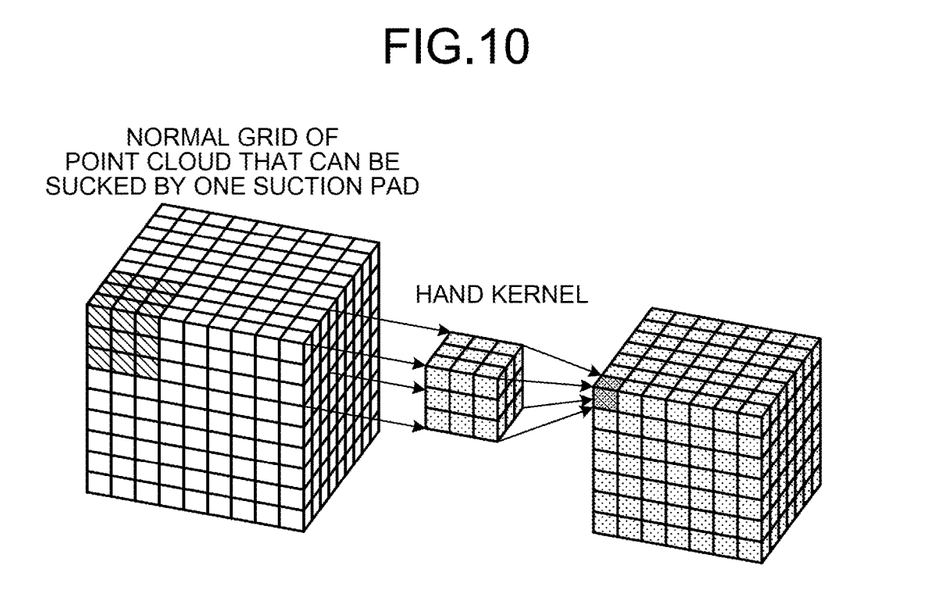
FIG. 10 is a diagram for describing a 3D convolution according to the embodiment.

FIG. 10 is a diagram for describing a 3D convolution according to the embodiment. The calculation unit 324 according to the embodiment performs a 3D convolution calculation between the left hand kernel and the normal grid and a 3D convolution calculation between the right hand kernel and the normal grid.

A problem of calculating a grasping posture in which the object 102 to be grasped can be sucked by the plurality of suction pads 6 is considered to calculate points satisfying two conditions that a distance between two points (a grasping point of one suction pad and a grasping point of the other suction pad 6) of grasping points that can be sucked by one suction pad 6 is d and normals of the two points are parallel with each other. If these two points are calculated by a general Euclidean distance calculation equation and a vector parallelism discriminant, a calculation amount becomes enormous.

For that reason, the calculation unit 324 finds an approximate solution of the points satisfying the above two conditions at a high speed by a difference between 3D convolution calculation results of each hand kernel. A 3D convolution calculation result between the hand kernel and the normal grid includes a position that can be sucked by the suction pad 6 and a normal of that position in a grid having the same size as that of the normal grid.

The calculation unit 324 decides a difference between a 3D convolution calculation result $S_L(X, Y, Z)$ of the left suction pad 6a and a 3D convolution calculation result $S_R(X, Y, Z)$ of the right suction pad 6b based on the following Equation 4.

$$f(X, Y, Z) = \begin{cases} \text{Suction by one suction pad,} & |S_L(X, Y, Z) - S_R(X, Y, Z)| > \epsilon \\ \text{Suction by two suction pads,} & |S_L(X, Y, Z) - S_R(X, Y, Z)| \leq \epsilon \text{ and} \\ & S_L(X, Y, Z) \neq nan \text{ and} \\ & S_R(X, Y, Z) \neq nan \\ \text{Suction is impossible,} & S_L(X, Y, Z) - S_R(X, Y, Z) = nan \end{cases} \tag{4}$$

Here, ε indicates a threshold value for deciding a difference between normals. The calculation unit 324 decides a case where the object to be grasped can be sucked and grasped by one suction pad, a case where the object to be grasped can be sucked and grasped by two suction pad, or a case where the object to be grasped cannot be sucked and grasped, based on the above Equation 4.

Calculation Example of Convolution

Figure 11:
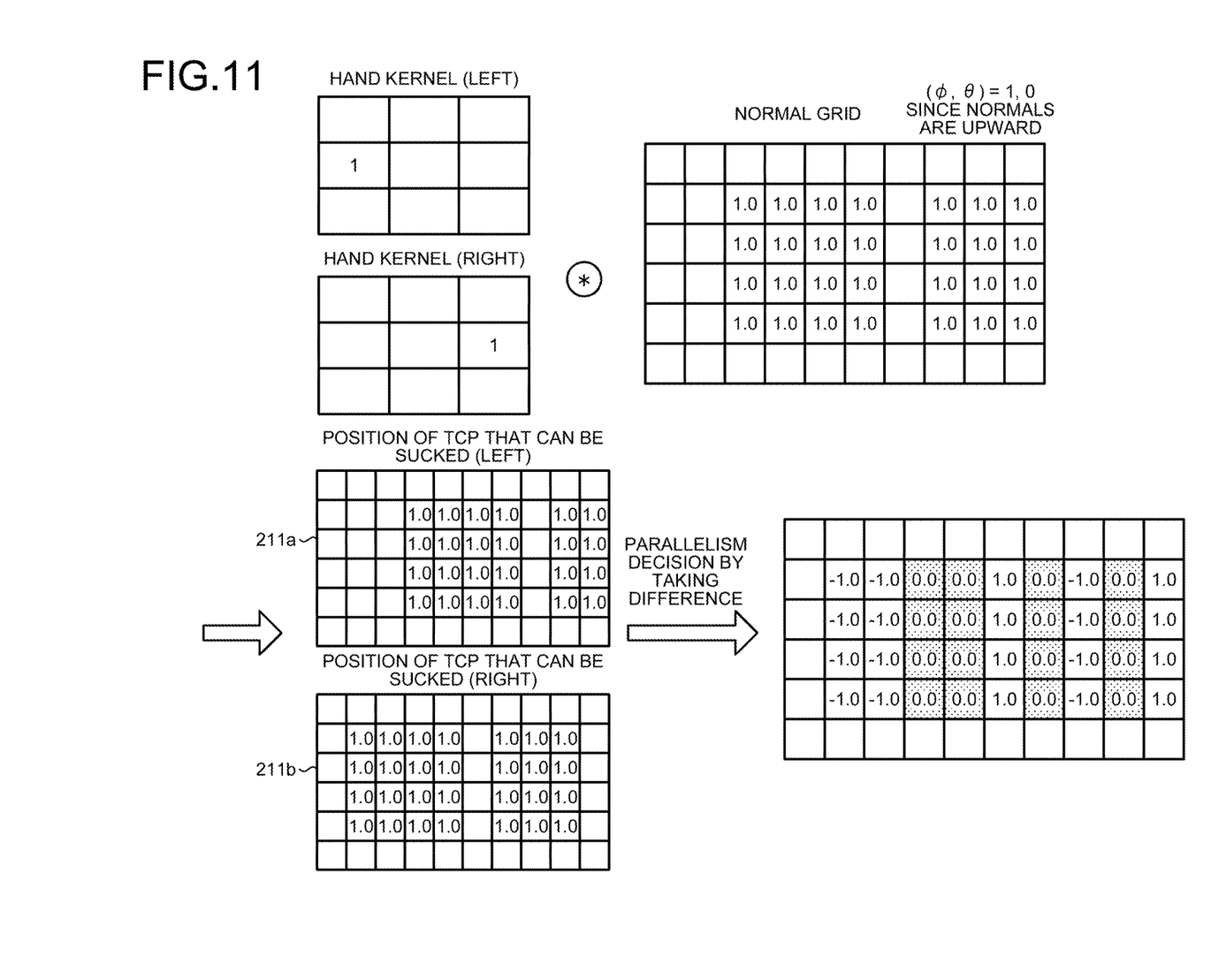
FIG. 11 is a diagram for describing a calculation example of a convolution according to the embodiment.

FIG. 11 is a diagram for describing a calculation example of a convolution according to the embodiment. In order to facilitate the understanding, an example of FIG. 11 illustrates an example of convolution calculation in a case where the object 102 to be grasped is a flat box. This case is a special case of a 3D convolution, and is the same as a result of a 2D convolution.

Since the box is placed flat, all of normals of a grasping surface of the box are upward, and the normals are expressed by $(\phi,\theta)=(1,0)$.

From a convolution calculation result 211a between the left hand kernel and the normal grid, a position of the TCP of the handling tool 2 that can be sucked by the left suction pad 6a is specified. Specifically, in the example of FIG. 11, the position of the TCP is specified by a position where the normal is $(\phi,\theta)=(1,0)$.

Similarly, from a convolution calculation result 211b between the right hand kernel and the normal grid, a position of the TCP of the handling tool 2 that can be sucked by the right suction pad 6b is specified. Specifically, in the example of FIG. 11, the position of the TCP is specified by a position where the normal is $(\theta,\phi)=(1,0)$.

The calculation unit 324 decides whether or not a normal of the position of the TCP of the handling tool 2 that can be sucked by the left suction pad 6a and the normal of the position of the TCP of the handling tool 2 that can be sucked by the right suction pad 6b are parallel with each other by taking a difference between the convolution calculation results 211a and 211b.

In the example of FIG. 11, a position where a result of taking the difference is (0,0) is a position that can be sucked by the two suction pads 6a and 6b. A position where a result of taking the difference is (1,0) is a position that can be sucked by the left suction pad 6a. A position where a result of taking the difference is (−1,0) is a position that can be sucked by the right suction pad 6b. A position where a result of taking the difference is empty (nan) is a position that cannot be grasped.

If the positions that can be sucked by the left suction pad 6a and the right suction pad 6b are known, evaluation values of the ease of grasping of the positions that can be sucked by the left suction pad 6a and the right suction pad 6b are found by the heat map indicating the ease of grasping by the one suction pad 6 output by the evaluation unit 321. An average value of these evaluation values can be calculated to calculate an evaluation value of the ease of grasping the two pads. Then, the evaluation value can be projected onto a base image to generate a heat map by the plurality of suction pads 6.

Example of Handling Method

Figure 12:
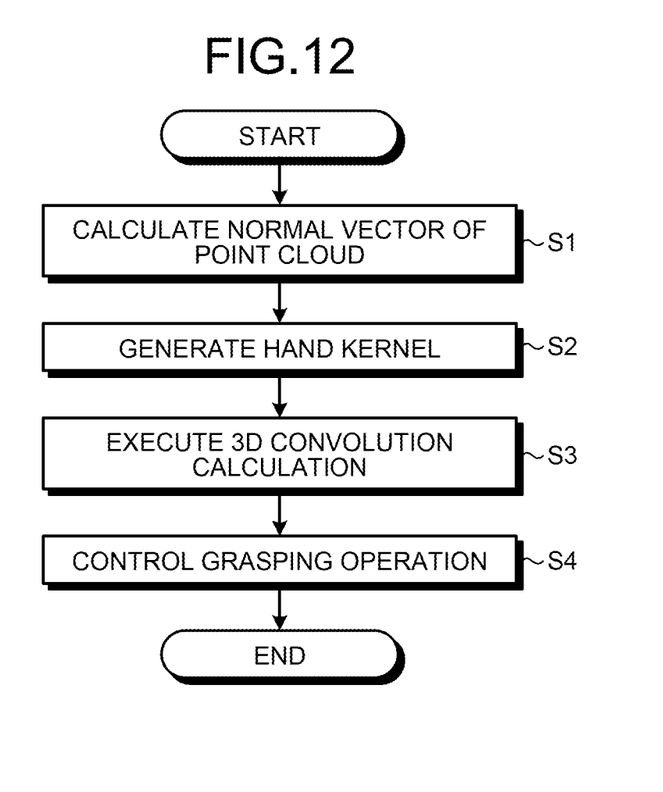
FIG. 12 is a flowchart illustrating an example of a handling method according to the embodiment.

FIG. 12 is a flowchart illustrating an example of a handling method according to the embodiment. First, the normal grid generation unit 322 converts a depth image including one or more objects 102 to be grasped into a point cloud, generates spatial data including the object 102 to be grasped that is divided into a plurality of grids from the point cloud, and calculates a normal vector of the point cloud included in the grid using spherical coordinates (step S1).

Next, the hand kernel generation unit 323 generates a hand kernel of each suction pad 6 based on a position of each suction pad 6 in the handling tool 2 and a posture of the handling tool 2 (Step S2).

Next, the calculation unit 324 calculates the ease of grasping the object 102 to be grasped by a plurality of suction pads 6 based on a 3D convolution calculation using a grid including the spatial data calculated by the processing of Step S1 and the hand kernel generated by the processing of Step S2 (Step S3).

Next, the control unit 33 controls a grasping operation of the manipulator (the arm 1 and the handling tool 2) based on the ease of grasping the object 102 to be grasped by the plurality of suction pads 6 (Step S4).

As described above, in the handling device 100 according to the embodiment, the ease of grasping of the object 102 to be grasped by the plurality of suction pads 6 is calculated based on the 3D convolution calculation described above. Therefore, according to the handling device 100 according to the embodiment, it is possible to determine an appropriate handling operation without performing re-learning using teacher data for learning the ease of grasping again, even though the number or a position of suction pads 6 is changed.

For example, at a distribution site, when a large object 102 to be grasped is sucked by the plurality of suction pads 6 and a plurality of small objects 102 to be grasped are simultaneously sucked by the plurality of suction pads 6, efficiency of an automatic picking work can be improved. The handling device 100 according to the embodiment can be used at such a distribution site or the like.

Finally, an example of a diagram illustrating an example of a hardware configuration of the controller 3 according to the embodiment will be described.

Example of Hardware Configuration

Figure 13:
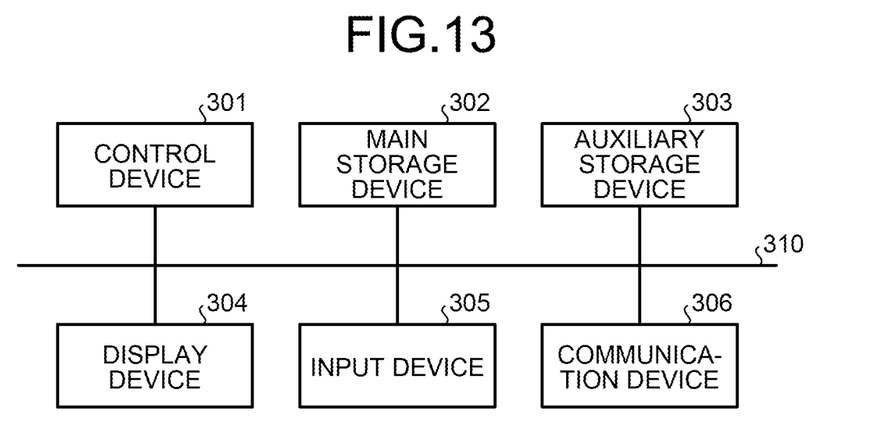
FIG. 13 is a diagram illustrating an example of a hardware configuration of a controller according to the embodiment.

FIG. 13 is a diagram illustrating an example of a hardware configuration of a diagram illustrating an example of the controller 3 according to the embodiment. The controller 3 includes a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected to each other through a bus 310.

Note that the display device 304, the input device 305, and the communication device 306 may not be included. For example, in a case where the controller 3 is connected to another device, a display function, an input function, and a communication function of another device may be used.

The control device 301 executes a program read from the auxiliary storage device 303 to the main storage device 302. The control device 301 is, for example, one or more processors such as a central processing unit (CPU). The main storage device 302 is a memory such as a read only memory (ROM) and a random access memory (RAM). The auxiliary storage device 303 is a memory card, a hard disk drive (HDD), or the like.

The display device 304 displays information. The display device 304 is, for example, a liquid crystal display. The input device 305 receives input of the information. The input device 305 is, for example, a hardware key or the like. Note that the display device 304 and the input device 305 may be a liquid crystal touch panel or the like having both of a display function and an input function. The communication device 306 communicates with another device.

The program executed by the controller 3 is a file having an installable or executable format, and is stored in a computer-readable storage medium such as a compact disc read only memory (CD-ROM), a memory card, a compact disc recordable (CD-R), and a digital versatile disc (DVD) and is provided as a computer program product.

The program executed by the controller 3 may be configured to be stored on a computer connected to a network such as the Internet and be provided by being downloaded via the network. In addition, the program executed by the controller 3 may be configured to be provided via a network such as the Internet without being downloaded.

In addition, the program executed by the controller 3 may be configured to be provided in a state of being incorporated in advance in a ROM or the like.

The program executed by the controller 3 has a module configuration including a function that can be realized by the program among functions of the controller 3.

Functions realized by the program are loaded into the main storage device 302 by reading and executing the program from a storage medium such as the auxiliary storage device 303 by the control device 301. In other words, the functions realized by the program are generated on the main storage device 302.

Note that some of the functions of the controller 3 may be realized by hardware such as an integrated circuit (IC). The IC is, for example, a processor executing dedicated processing.

In addition, in a case where functions are realized using a plurality of processors, each processor may realize one of the functions or two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A handling device comprising:
   a manipulator that includes a handling tool including a plurality of suction pads and an arm;
   a memory; and
   one or more hardware processors electrically coupled to the memory and configured to:
   convert a depth image including one or more objects to be grasped into a point cloud, generate spatial data including the one or more objects to be grasped that is divided into a plurality of grids from the point cloud, and calculate a normal vector of the point cloud included in the grid using spherical coordinates;
   generate a hand kernel of each of the suction pads based on a position of each of the suction pads in the handling tool and a posture of the handling tool;
   calculate ease of grasping each of the one or more objects to be grasped by the plurality of suction pads based on a 3D convolution calculation using a grid including the spatial data and the hand kernel; and
   control a grasping operation of the manipulator based on the ease of grasping the object to be grasped by the plurality of suction pads,
   wherein the one or more hardware processors generate each hand kernel based on the position of each suction pad, and calculate the ease of grasping of each of the one or more objects to be grasped by the plurality of suction pads based on a difference between each value of the 3D convolution calculation using the grid including the spatial data and each hand kernel.

2. The handling device according to claim 1, wherein the one or more hardware processors express the posture of the handling tool by a first angle and a second angle of the spherical coordinates and generates the hand kernel according to the first and second angles for each of the suction pads.

3. The handling device according to claim 1, wherein the one or more hardware processors express the ease of grasping the object to be grasped by the plurality of suction pads by a first heat map, and
   the one or more hardware processors are further configured to adjust the posture of the handling tool and a position where the object to be grasped is grasped by the handling tool based on the first heat map.

4. The handling device according to claim 1, the one or more hardware processors are further configured to
   calculate an evaluation value indicating the ease of grasping the object to be grasped by one suction pad based on the depth image,
   wherein the one or more hardware processors are configured to:
   convert the depth image into three-dimensional point cloud data;
   delete points whose evaluation values are smaller than a threshold value from the three-dimensional point cloud data to generate grasping target point cloud data; and
   generate the spatial data from the grasping target point cloud data.

5. The handling device according to claim 4, wherein one or more hardware processors
   calculate the evaluation value using a neural network having an input layer receiving an input of the depth image and an output layer outputting a second heat map indicating the evaluation value,
   specify points whose evaluation values are smaller than the threshold value from the second heat map, and
   delete the points whose evaluation values are smaller than the threshold value from the three-dimensional point cloud data to generate the grasping target point cloud data.

6. A computer program product having a non-transitory computer readable medium including programmed instructions for controlling a manipulator that includes a handling tool including a plurality of suction pads and that includes an arm, wherein the instructions, when executed by a computer, cause the computer to function as:
   a normal grid generation unit that converts a depth image including one or more objects to be grasped into a point cloud, generates spatial data including the one or more objects to be grasped that is divided into a plurality of grids from the point cloud, and calculates a normal vector of the point cloud included in the grid using spherical coordinates;
   a hand kernel generation unit that generates a hand kernel of each of the suction pads based on a position of each of the suction pads in the handling tool and a posture of the handling tool;
   a calculation unit that calculates ease of grasping each of the one or more objects to be grasped by the plurality of suction pads based on a 3D convolution calculation using a grid including the spatial data and the hand kernel; and a control unit that controls a grasping operation of the manipulator based on the ease of grasping the object to be grasped by the plurality of suction pads,
wherein the instructions further cause the computer to generate each hand kernel based on the position of each suction pad, and calculate the ease of grasping of each of the one or more objects to be grasped by the plurality of suction pads based on a difference between each value of the 3D convolution calculation using the grid including the spatial data and each hand kernel.

* * * * *

UNITED STATES PATENT AND TRADEMARK OFFICE
CERTIFICATE OF CORRECTION

| | |
|---|---|
| PATENT NO. | : 11,691,275 B2 |
| APPLICATION NO. | : 17/191447 |
| DATED | : July 4, 2023 |
| INVENTOR(S) | : Ping Jiang et al. |

It is certified that error appears in the above-identified patent and that said Letters Patent is hereby corrected as shown below:

In the Claims

In Claim 2, Column 10, Line 6, "generates" should read --generate--.

Signed and Sealed this
Twenty-sixth Day of September, 2023

*Katherine Kelly Vidal*

Katherine Kelly Vidal
*Director of the United States Patent and Trademark Office*